(12) United States Patent
Kim et al.

(10) Patent No.: US 10,878,155 B2
(45) Date of Patent: Dec. 29, 2020

(54) SYSTEM AND METHOD FOR ESTIMATING LEAKAGE POWER OF CIRCUIT DESIGN AT EARLY STAGE

(71) Applicant: BAUM CO., LTD., Seongnam-si (KR)

(72) Inventors: Jong Gyu Kim, Seoul (KR); In Hak Han, Daejeon (KR)

(73) Assignee: BAUM CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/682,866

(22) Filed: Nov. 13, 2019

(65) Prior Publication Data

US 2020/0151296 A1 May 14, 2020

(30) Foreign Application Priority Data

Nov. 14, 2018 (KR) .................. 10-2018-0140031

(51) Int. Cl.
*G06F 30/36* (2020.01)
*G06F 30/32* (2020.01)
*G06F 30/367* (2020.01)
*G06F 30/327* (2020.01)
*G06F 119/06* (2020.01)

(52) U.S. Cl.
CPC .......... *G06F 30/367* (2020.01); *G06F 30/327* (2020.01); *G06F 2119/06* (2020.01)

(58) Field of Classification Search
CPC .............................. G06F 30/327; G06F 30/367
USPC ........................................ 716/103, 109, 133
See application file for complete search history.

(56) References Cited

U.S. PATENT DOCUMENTS

| 7,793,239 B2* | 9/2010 | Engel et al. .......... G06F 30/367 716/113 |
| 8,275,331 B2* | 9/2012 | Verma et al. ......... H04W 52/52 455/127.2 |
| 2016/0217239 A1* | 7/2016 | Venkatesh et al. ..... G06F 30/33 |

FOREIGN PATENT DOCUMENTS

| JP | 2005-071360 | 3/2005 |
| KR | 10-1139603 | 4/2012 |

OTHER PUBLICATIONS

Korean Office Action for 10-2018-0140031 dated Nov. 14, 2018.
(Continued)

*Primary Examiner* — Sun J Lin
(74) *Attorney, Agent, or Firm* — Nixon Peabody LLP; Jeffrey L. Costellia

(57) ABSTRACT

A computer-implemented method of estimating leakage power of a circuit design may include: obtaining waveform data by performing a functional simulation on a circuit design according to reference input signals; obtaining leakage power data by calculating power consumption of the circuit design according to the waveform data; generating a leakage power model of the circuit design based on the waveform data and the leakage power data; and estimating leakage power of the circuit design by performing a functional simulation on the circuit design according to test input signals on a basis of the leakage power model.

20 Claims, 11 Drawing Sheets

(56) References Cited

OTHER PUBLICATIONS

Kim, et al., "High-Level Power Modeling of Clock Gated Circuits", Journal of The Institute of Electronics and Information Engineers, vol. 52, No. 10, Oct. 2015.
Rethinagiri et al., "PETS: Power and Energy Estimation Tool at System-Level", 15$^{th}$ Int'l Symposium on Quality Electronic Design, 2014, pp. 535-542.
Chandrasekar, et al., "Improved Power Modeling of DDR SDRAMs", 2011, 14$^{th}$ Euromicro Conference on Digital System Design, pp. 99-108.

\* cited by examiner

| PER | IN[1]$_{AVG}$ | IN[2]$_{AVG}$ | ... | IN[m]$_{AVG}$ | PWR$_{AVG}$ |
|---|---|---|---|---|---|
| PER1 | X11 | X12 | ... | X1m | P1 |
| PER2 | X21 | X22 | ... | X2m | P2 |
| ⋮ | ⋮ | ⋮ | ⋱ | ⋮ | ⋮ |
| PERr | Xm1 | Xm2 | ... | Xrm | Pr |

T7

S690

START
↓
GROUP UNIT INTERVALS BASED ON AVERAGE LEVELS — S692
↓
CALCULATE AVERAGE OF LEAKAGE POWER AVERAGES — S694
↓
GENERATE LINEAR MODEL — S696
↓
END

FIG. 9
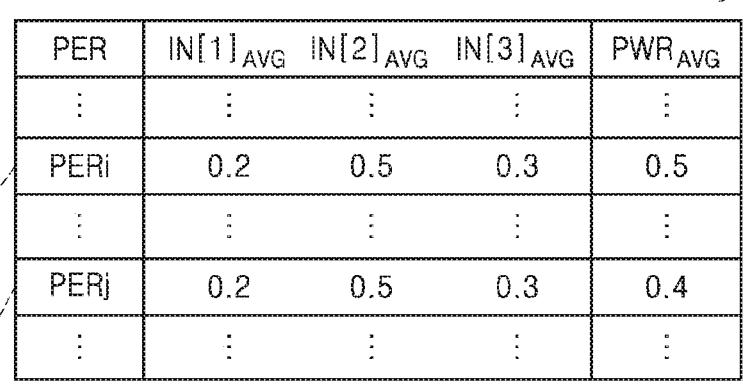
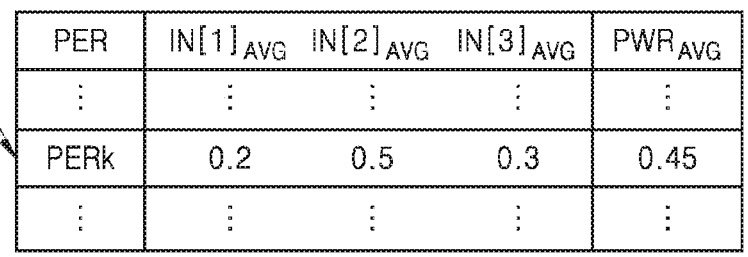

SYSTEM AND METHOD FOR ESTIMATING LEAKAGE POWER OF CIRCUIT DESIGN AT EARLY STAGE

CROSS-REFERENCE TO RELATED APPLICATION

This application claims the benefit of Korean Patent Application No. 10-2018-0140031, filed on Nov. 14, 2018, in the Korean Intellectual Property Office, the disclosure of which is incorporated herein in its entirety by reference.

BACKGROUND

1. Field

One or more embodiments relate to leakage power of integrated circuits, and more particularly, to a system and method for estimating leakage power of a circuit design at an early stage.

2. Description of the Related Art

As semiconductor processes are miniaturized, the influence of leakage power on integrated circuits becomes significant. For example, the deviation of leakage power may increase due to process variations, and particularly power leaking at corner conditions may be about half the total power consumption of an integrated circuit. Accordingly, it is required to reduce semiconductor process variations and design integrated circuits having reduced power leakage.

During a process of producing integrated circuits such as a process of designing integrated circuits, if the leakage power of integrated circuits is calculated or measured after the layout of integrated circuits is determined, overhead may increase due to integrated circuit redesigning, and the time period for designing integrated circuits may markedly increase to delay the time-to-market of integrated circuits. Accordingly, it may be required to accurately estimate power leakage at an early stage in the design process of integrated circuits.

SUMMARY

One or more embodiments include a system and method for estimating leakage power of a circuit design at an early stage in integrated circuit manufacture.

Additional aspects will be set forth in part in the description which follows and, in part, will be apparent from the description, or may be learned by practice of the presented embodiments.

According to one or more embodiments, a system may include at least one processor configured to perform a method of estimating leakage power of a circuit design by executing computer-executable instructions, wherein the method of estimating leakage power of a circuit design may include: obtaining waveform data by performing a functional simulation on a circuit design according to reference input signals; obtaining leakage power data by calculating power consumption of the circuit design according to the waveform data; generating a leakage power model of the circuit design based on the waveform data and the leakage power data; and estimating leakage power of the circuit design by performing a functional simulation on the circuit design according to test input signals on a basis of the leakage power model.

The leakage power model may include a look-up table providing an average of the leakage power for a unit interval, the average corresponding to a combination of average levels of respective input signals to the circuit design for the unit interval.

The leakage power model may include a linear function usable to calculate an average of the leakage power for a unit interval from average levels of respective input signals to the circuit design for the unit interval.

The leakage power data may include a graph of the leakage power synchronized with the waveform data.

The generating of the leakage power model may include: respectively calculating average levels of the reference input signals for each unit interval; and calculating an average of the leakage power for each unit interval.

The generating of the leakage power model may further include grouping unit intervals having identical average levels of the reference input signals as one unit interval and calculating an average of the averages of the leakage power in the grouped unit intervals.

The circuit design may include a clock input, and the unit interval may be a multiple of a cycle of a clock signal applied to the clock input.

The generating of the leakage power model may include: respectively calculating first average levels of the reference input signals and a first average of the leakage power for a first unit interval; and respectively calculating second average levels of the reference input signals and a second average of the leakage power for a second unit interval.

The generating of the leakage power model may further include: grouping the first and second unit intervals as one unit interval when the first average levels are equal to the second average levels; and calculating an average of the first and second averages of the leakage power.

The estimating of the leakage power may include: providing the leakage power model with average levels of the test input signals for each unit interval; and recording output power of the leakage power model for each unit interval.

The estimating of the leakage power may include: obtaining conditions of input signals to the circuit design; and generating the reference input signals based on random numbers and the conditions of the input signals.

The circuit design may include netlist data defining a plurality of elements and a connection relationship between the plurality of elements.

The waveform data may include a format of at least one of a value change dump (VCD) and a fast signal database (FSDB).

According to one or more embodiments, a computer-implemented method of estimating leakage power of a circuit design may include: obtaining waveform data by performing a functional simulation on a circuit design according to reference input signals; obtaining leakage power data by calculating power consumption of the circuit design according to the waveform data; generating a leakage power model of the circuit design based on the waveform data and the leakage power data; and estimating leakage power of the circuit design by performing a functional simulation the circuit design according to test input signals on a basis of the leakage power model.

According to one or more embodiments, a non-transitory storage medium may store computer-executable instructions for performing operations of estimating leakage power of a circuit design using at least one processor, and the operation may include: obtaining waveform data by performing a functional simulation on a circuit design according to reference input signals; obtaining leakage power data by calculating power consumption of the circuit design according to the waveform data; generating a leakage power model of the circuit design based on the waveform data and the leakage power data; and estimating leakage power of the circuit design by performing a functional simulation on the circuit design according to test input signals on a basis of the leakage power model.

BRIEF DESCRIPTION OF THE DRAWINGS

These and/or other aspects will become apparent and more readily appreciated from the following description of the embodiments, taken in conjunction with the accompanying drawings in which:

FIG. 9 is a diagram illustrating example operations of the method of FIG. 8, according to an example embodiment;

DETAILED DESCRIPTION

Figure 1:
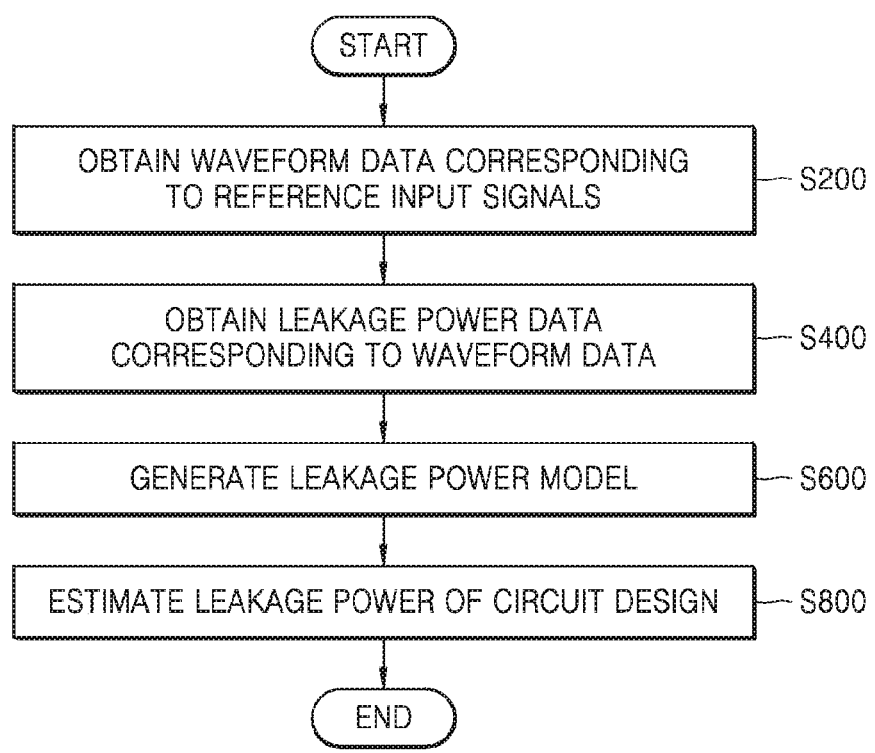
FIG. 1 is a flowchart illustrating a method of estimating leakage power of a circuit design at an early stage, according to an example embodiment.

As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described with reference to the accompanying drawings. These embodiments are provided to more fully explain the present disclosure to those of ordinary skill in the art. The present disclosure may be exemplified in many different forms according to example embodiments, and some example embodiments will now be described with reference to the accompanying drawings. However, the present disclosure is not limited to the embodiments, and it should be understood that various modifications, equivalents, and replacements of the embodiments may be made within the idea and technical scope of the present disclosure. In the accompanying drawings, the same or similar reference numerals denote the same or similar elements. In the drawings, sizes of elements may be exaggerated for convenience of explanation.

The terminology used herein is for explaining specific embodiments only and is not intended to limit the scope of the present disclosure. The terms of a singular form may include plural forms unless otherwise mentioned. The meaning of "include" or "comprise" specifies a property, a fixed number, a step, an operation, an element, a component, or a combination thereof but does not exclude other properties, fixed numbers, steps, operations, elements, components, or combinations thereof.

Although terms such as "first" and "second" may be used herein to describe various elements or components, these elements or components should not be limited by these terms. These terms are only used to distinguish one element or component from other elements or components. For example, within the scope of the present disclosure, a first element may be referred to a second element, and similarly a second element may be referred to as a first element.

Unless defined otherwise, all terms used herein, including technical and scientific terms, have the same meanings as those commonly understood by those skilled in the art to which the present disclosure pertains. Terms such as those defined in a generally used dictionary may be interpreted to have the same meanings as the contextual meanings in the relevant field of art, and are not to be interpreted to have ideal or excessively formal meanings unless clearly defined herein.

FIG. 1 is a flowchart illustrating a method of estimating leakage power of a circuit design at an early stage, according to an example embodiment. Referring to FIG. 1, the method of estimating leakage power of a circuit design at an early stage may include a plurality of operations S200, S400, S600, and S800.

High-level power modeling which is based on various factors may be used to estimate the power consumption of an integrated circuit in an early stage. For example, in "Pets: Power and energy estimation tool at system-level" (S. K. Rethinagiri, O. Palomar, O. Unsal, A. Cristal, R. B. Atitallah, and S. Niar, In Fifteenth International Symposium on Quality Electronic Design, pp. 535-542, 2014), the number of cycles per instruction, fetch access rate, cache miss rate, or the like is used to estimate the power consumption of a processor. In "Improved power modeling of DDR SDRAMs" (K. Chandrasekar, B. Akesson, and K. Goossens, In 2011 14th Euromicro Conference on Digital System Design, pp. 99-108. 2011), the number of cycles performed per operation mode is used to estimate the power consumption of a synchronous dynamic random access memory (SDRAM). Furthermore, in Korean Patent No. 10-1139603, a clock gating driving signal is used to estimate power consumption.

Unlike the above-mentioned power modeling for estimating the total power consumption of an integrated circuit, according to the method shown in FIG. 1 for estimating the leakage power consumption of an integrated circuit, a leakage power model may be generated based on the levels of signals, and the leakage power of an integrated circuit may be estimated in an early stage by using the leakage power model. The method shown in FIG. 1 may be carried out by any system configured to estimate leakage power of a circuit design for producing an integrated circuit. In some embodiments, the method shown in FIG. 1 may be performed by a computing system that includes at least one processor and a memory storing instructions executable by the at least one processor. For example, the computing system may include a mobile computing system such as a laptop computer or a smartphone as well as a stationary computing system such as a desktop computer or a server.

The circuit design may refer to any data that defines an integrated circuit or a functional block included in the integrated circuit. For example, as described later with reference to FIG. 13, an integrated circuit may be defined by register transfer level (RTL) data, netlist data, layout data, or the like in an integrated circuit manufacturing process. In the present specification, netlist defining elements (or standard cells) included in an integrated circuit and a connection relationship between the elements may be mainly described in a circuit design. However, embodiments are not limited thereto.

Referring to FIG. 1, in operation S200, waveform data of a circuit design corresponding to reference input signals may be obtained. In some embodiments, the waveform data may be obtained by performing a functional simulation on the circuit design according to the reference input signals. The reference input signals may be input signals applied to inputs (or input ports) of the circuit design and may include various combinations of input signals to obtain various leakage power values of the circuit design. An example of generating the reference input signals will be described later with reference to FIG. 12.

The waveform data may refer to data representing input signals, internal signals, and output signals of the circuit design according to the lapse of time. For example, the waveform data may represent variations in the levels of input signals, internal signals, and output signals according to the lapse of time. Each signal of the circuit design may have a high level (for example, a positive supply voltage) or a low level (for example, a ground voltage), and in the present specification, a signal having a high level may be referred to as having a value of "1" and a signal having a low level may be referred to as having a value of "0." In some embodiments, as described later with reference to FIG. 4, the waveform data may have a format of at least one of a value change dump (VCD) and fast signal database (FSDB).

In operation S400, leakage power data corresponding to the waveform data may be obtained. In some embodiments, the leakage power data may be obtained by calculating power consumption of the circuit design according to the waveform data obtained in operation S200. The power consumption of the circuit design (or an integrated circuit) may include dynamic power and static power. The dynamic power may refer to power consumed due to signal transition, and the static power may refer to power consumed while maintaining the levels of signals. In the present specification, leakage power may refer to static power, and leakage power data may include information about static power of calculated power consumption of the circuit design. In some embodiments, as described later with reference to FIG. 6, the leakage power data may include a graph of leakage power (or static power) synchronized with the waveform data.

In operation S600, a leakage power model may be generated. The leakage power model may correspond to the circuit design and may provide leakage power according to input signals to the circuit design. In some embodiments, the leakage power model may include a look-up table providing the average of leakage power for a unit interval and the average of leakage power may correspond to a combination of the average levels of respective input signals to the circuit design for the unit interval. Furthermore, in some embodiments, the leakage power model may include a linear function for calculating the average of leakage power for the unit interval from the average levels of the respective input signals to the circuit design for the unit interval. An example of operation S600 will be described later with reference to FIG. 5.

In operation S800, leakage power of the circuit design may be estimated. In some embodiments, the leakage power of the circuit design may be estimated by performing a functional simulation on the circuit design according to test input signals based on the leakage power model. Accordingly, the leakage power of the circuit design may be estimated through the functional simulation, and according to the test input signals, leakage power of the circuit design, that is, a leakage power waveform of the circuit design, may be obtained. The leakage power waveform obtained according to the test input signals may make it possible to easily analyze the leakage power of the circuit design. In addition, since the leakage power of the circuit design is estimated by the functional simulation instead of performing a timing analysis on the circuit design, a time period for estimating the leakage power of the circuit design may be reduced, and more actual leakage power may be estimated at an early stage. As a result, a time period for designing an integrated circuit may be markedly reduced, and an integrated circuit having a high performance may be rapidly designed and manufactured.

Figure 2:
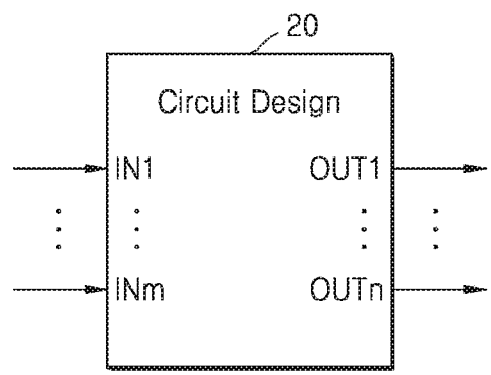
FIG. 2 is a block diagram illustrating a circuit design according to an example embodiment.
Figure 3:
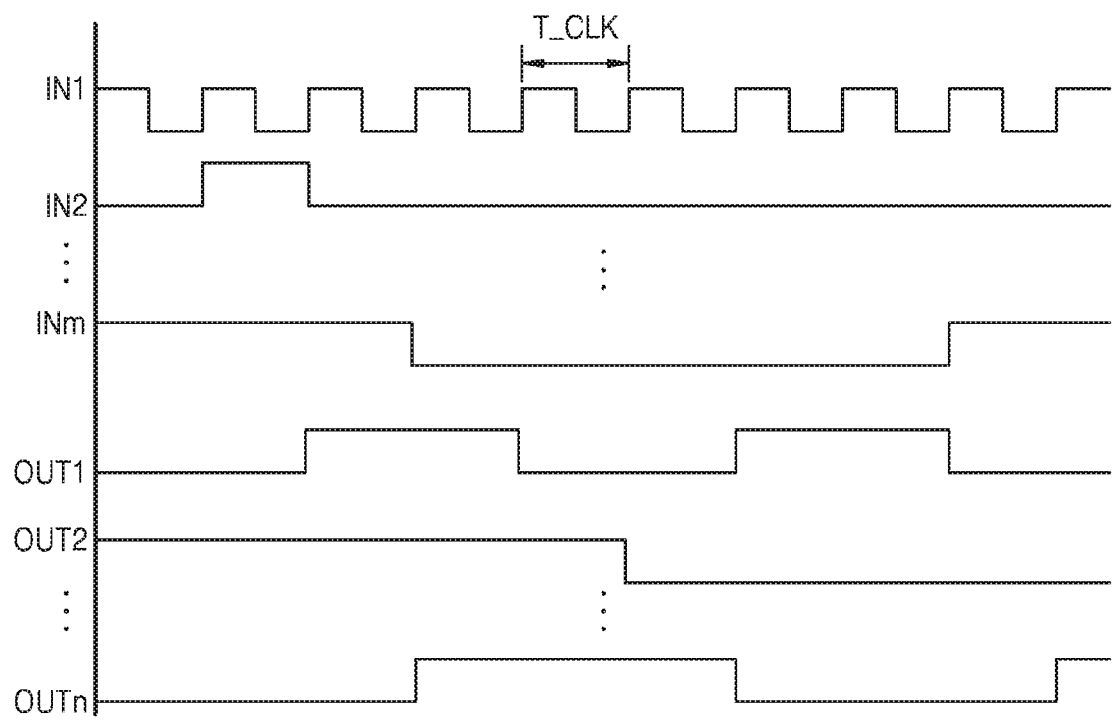
FIG. 3 is a timing diagram illustrating input signals and output signals of the circuit design of FIG. 2, according to an example embodiment.

FIG. 2 is a block diagram illustrating a circuit design 20 according to example embodiment, and FIG. 3 is a timing diagram illustrating input signals and output signals of the circuit design 20 illustrated in FIG. 2, according to an example embodiment. For example, the timing diagram of FIG. 3 shows waveforms obtained by performing a functional simulation on the circuit design 20 of FIG. 2. For ease of illustration, the delay of signals such as propagation delay or gate delay may be omitted in the timing diagrams appended to the present specification.

As discussed above with reference to FIG. 1, the circuit design 20 may be any data defining an integrated circuit or a functional block included in the integrated circuit. The circuit design 20 may include inputs IN1 to INm (m is an integer greater than 1) and outputs OUT1 to OUTn (n is an integer greater than 1). In some embodiments, unlike the circuit design 20 shown in FIG. 2, a circuit design may include single input and/or single output. Signals (that is, input signals) to the inputs IN1 to INm and signals (that is, output signals) from the outputs OUT1 to OUTn may each have a value of 0 or 1.

In some embodiments, the inputs IN1 to INm of the circuit design 20 may include a clock input. For example, as shown in FIG. 3, a first input IN1 of the circuit design 20 may be a clock input, and a clock signal oscillating with a cycle T_CLK may be applied to the first input IN1. The circuit design 20 may operate in synchronization with the clock signal applied to the first input IN1. For example, the circuit design 20 generates output signals through the outputs OUT1 to OUTn by processing the input signals applied to the inputs IN1 to INm in synchronization with rising edges of the clock signal.

Figure 4:
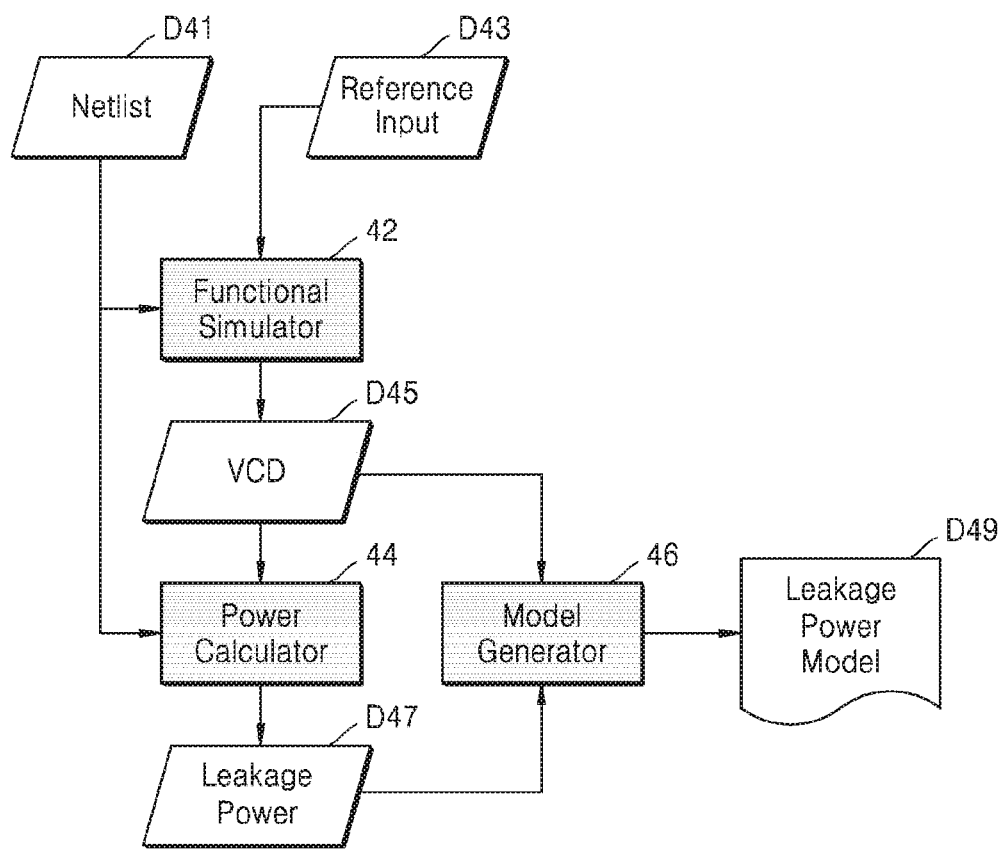
FIG. 4 is a block diagram illustrating flows of data according to an example embodiment.

FIG. 4 is a block diagram illustrating flows of data according to an example embodiment. When the example embodiment shown in FIG. 4 is compared with the example embodiment shown in FIG. 1, a circuit design may correspond to netlist data D41, waveform data may correspond to VCD data D45 (and/or FSDB data), and reference input signals may corresponding to reference input data D43.

Referring to FIG. 4, the netlist data D41 and the reference input data D43 may be provided to a functional simulator 42. The functional simulator 42 may simulate the circuit design defined by the netlist data D41 according to input signals included in the reference input data D43 to generate the VCD data D45 representing the values (or levels) of the input signals, internal signals, and output signals of the circuit design according to time. In some embodiments, the functional simulator 42 may be a software block including a series of instructions and may be executed on a computing system including a processor and a display device. The functional simulator 42 may display the waveforms of the input signals, internal signals, and output signals on the display device on the basis of the VCD data D45.

The netlist data D41 and the VCD data D45 may be provided to a power calculator 44. The power calculator 44 may calculate power consumption of the circuit design defined by the netlist data D41 according to the values of signals defined by the VCD data D45. The power calculator 44 may generate a power consumption graph of the circuit design in synchronization with the VCD data D45. In some embodiments, the power calculator 44 may be a software block including a series of instructions and may be executed on a computing system including a processor and a display device, and the power calculator 44 may display the power consumption graph of the circuit design on the display device. In addition, the power calculator 44 may separately calculate dynamic power and static power of the circuit design and may generate leakage power data D47 on the basis of the calculated static power. As described above with reference to FIG. 1, the leakage power data D47 may include a leakage power graph synchronized with the VCD data D45.

The VCD data D45 and the leakage power data D47 may be provided to a model generator 46, and the model generator 46 may generate a leakage power model D49 corresponding to the circuit design defined by the netlist data D41 on the basis of the VCD data D45 and the leakage power data D47. In some embodiments, the leakage power model D49 may include a look-up table providing the average of leakage power for a unit interval and the average of leakage power may correspond to a combination of the average levels of the input signals to the circuit design for the unit interval. Furthermore, in some embodiments, the leakage power model D49 may include a linear function for calculating the average of leakage power for the unit interval from the average levels of the input signals to the circuit design for the unit interval. In some embodiments, the model generator 46 may be a software block including a series of instructions and may be executed on a computing system including a processor. An example operation of the model generator 46, that is, an example of operation S600 shown in FIG. 1, will now be described with reference to FIG. 5.

Figure 5:
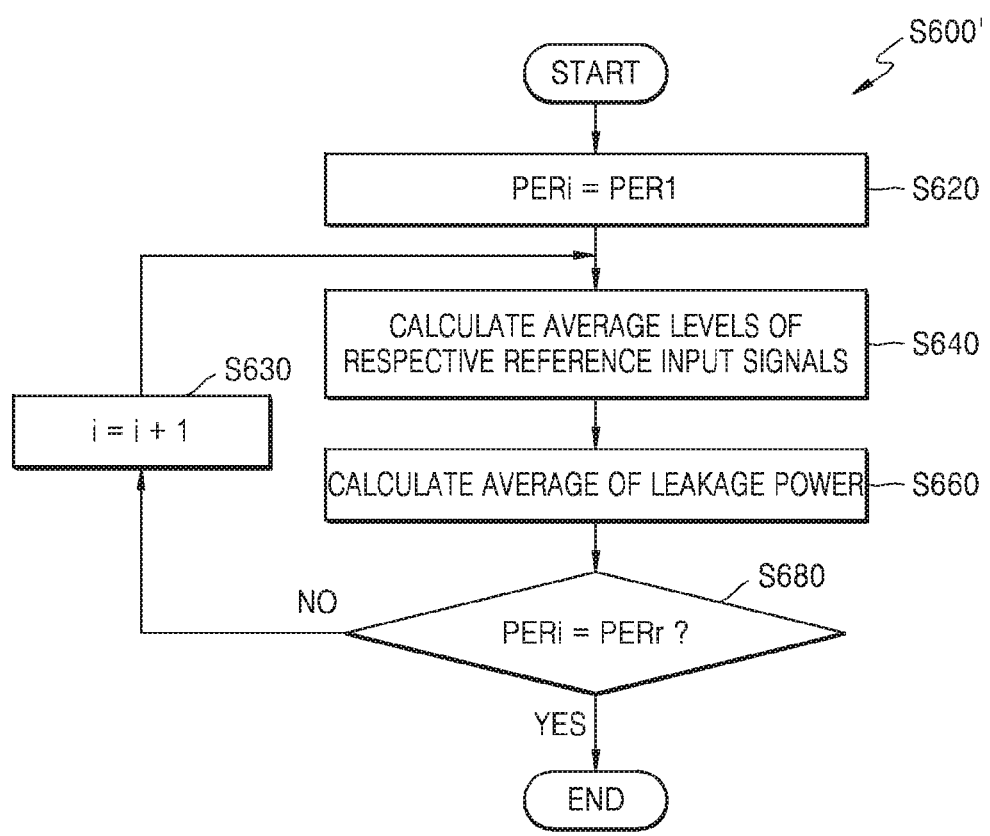
FIG. 5 is a flowchart illustrating an example of operation S600 of FIG. 1, according to an example embodiment.
Figure 6:
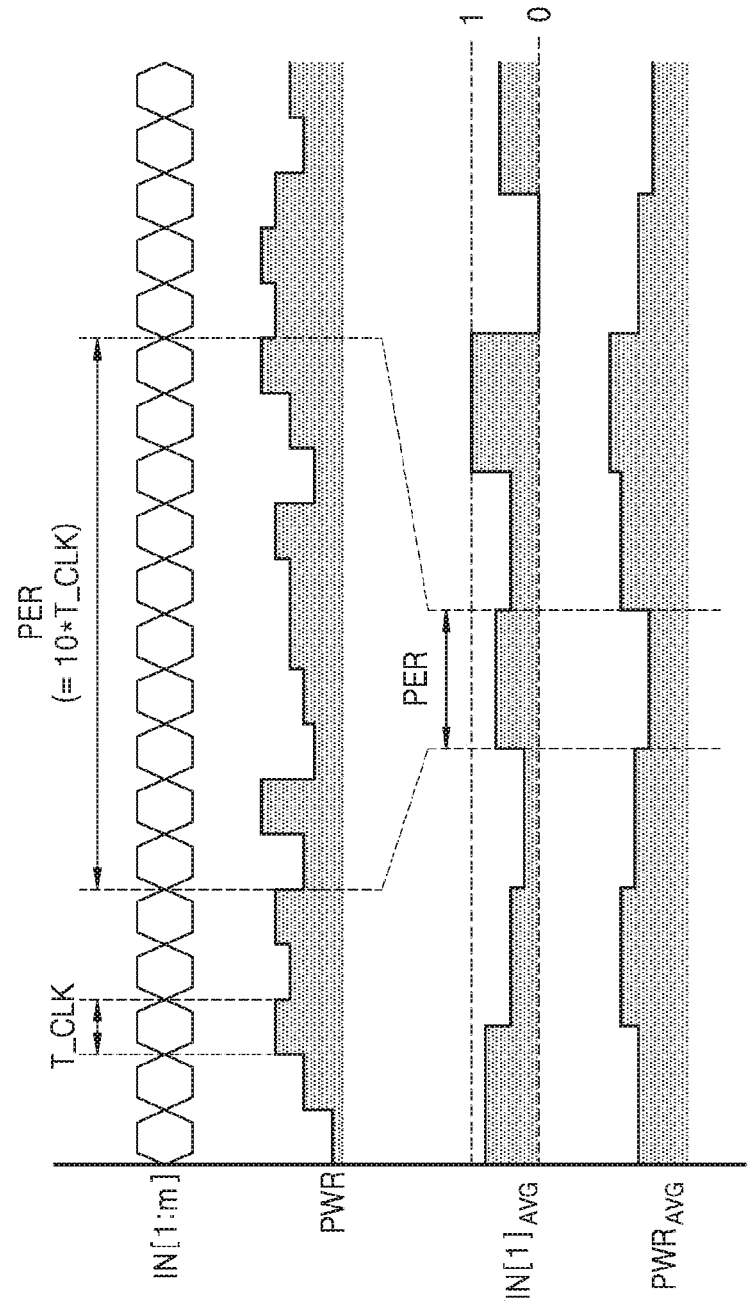
FIG. 6 is a timing diagram illustrating an example operation of generating a leakage power model, according to an example embodiment.

FIG. 5 is a flowchart illustrating an example of operation S600 shown in FIG. 1, according to an example embodiment, and FIG. 6 is a timing diagram illustrating an example operation of generating a leakage power model according to an example embodiment. As described with reference to FIGS. 1 and 4, a leakage power model may be generated in operation S600' shown in FIG. 5. As shown in FIG. 5, operation S600' may include a plurality of operations S620, S640, S660, and S680. For example, operation S600' shown in FIG. 5 may be performed by the model generator 46 shown in FIG. 4, and FIGS. 5 and 6 will now be described with reference to FIGS. 1 and 4.

In some embodiments, the leakage power model may include a look-up table providing the average of leakage power for a unit interval which corresponds to a combination of the average levels of the input signals to the circuit design for the unit interval. For example, the model generator 46 may divide a time period defined by waveform data (for example, the VCD data D45 shown in FIG. 4) into r unit intervals (where r is an integer greater than 1). Each of the unit intervals may be a time period having a certain length, and in some embodiments, each of the unit intervals may be a multiple of the cycle of a clock signal applied as a clock input. For example, as shown in FIG. 6, a unit interval PER may correspond to 10 times the cycle T_CLK of a clock signal. The length of the unit interval may be associated with the resolution of the leakage power model and may be adjusted on the basis of a required level of leakage power and the complexity of calculation. In the present specification, as shown in FIG. 6, it is assumed that the unit interval corresponds to 10 times the cycle T_CLK of the clock signal, but example embodiments are not limited thereto.

In operation S620, initialization may be performed. For example, as shown in FIG. 5, a current unit interval (or an i-th unit interval) PERi may be set as a first unit interval PER1. In FIG. 5, a variable i may be an index indicating one of r unit intervals ($1 \leq i \leq r$).

In operation S640, the average levels of the respective reference input signals may be calculated. The average level of each reference input signal may be the average of levels that the reference input signal has for a unit interval, and since each reference input signal has a value of 0 or 1, the average level may range from 0 to 1. Accordingly, the average level may indicate a probability that an input signal has a value of 1 for the unit interval. For example, as shown in FIG. 6, in a unit interval PER, m-bit input signals IN[1:m] may have various values. In addition, the average level $IN[1]_{AVG}$ of a first input signal IN[1] applied to the first input IN1 among the m inputs IN1 to INm may be calculated, and as shown in FIG. 6, the average level $IN[1]_{AVG}$ of the first input signal IN[1] may have a value of 0 to 1 in a unit interval PER. As described above, the average level of each of the reference input signals may be calculated in each unit interval.

In operation S660, the average of leakage power may be calculated. For example, as shown in FIG. 6, leakage power data (for example, the leakage power data D47 shown in FIG. 4) may include a graph of leakage power PWR that varies with time. The leakage power PWR may vary during a unit interval PER, and the average $PWR_{AVG}$ of the leakage power PWR in the unit interval PER may be calculated as a constant value. As described above, the average of leakage power may be calculated in each unit interval.

In operation S680, it may be determined whether the current unit interval PERi is the last unit interval PERr. For example, in operation S680, it may be determined whether the variable i is equal to r. As shown in FIG. 5, when the current unit interval PERi is the last unit interval PERr, operation S600' may be ended. On the other hand, when the current unit interval PERi is not the last unit interval PERr, operation 630 may be performed to increase the variable i by 1. Then, in operations S640 and S660, averages corresponding to the next unit interval PERi may be calculated.

Figures 7, 8:
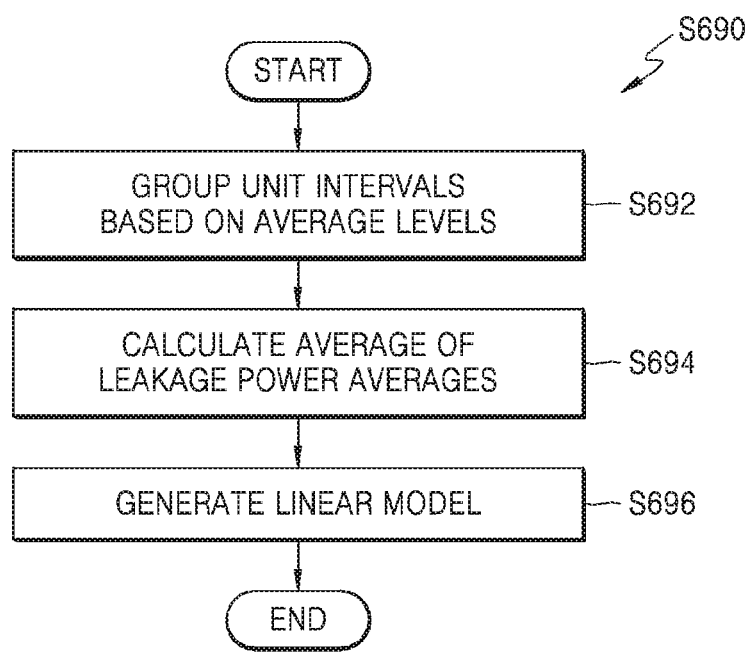
FIG. 7 is a diagram illustrating an example leakage power model according to an example embodiment.
FIG. 8 is a flowchart illustrating a method of generating a leakage power model, according to an example embodiment.

FIG. 7 is a diagram illustrating an example leakage power model according to an example embodiment. For example, FIG. 7 may illustrate a leakage power model including averages obtained through operation S600' shown in FIG. 5. In some embodiments, as shown in FIG. 7, the leakage power model may include Table T7 including averages corresponding to r unit intervals. Hereinafter, FIG. 7 will be described with reference to FIGS. 5 and 6.

As described above with reference to FIG. 5, as operation S600' is completed, the average level of each reference input signal and the average of leakage power may be obtained in each of a plurality of unit intervals. For example, as shown in FIG. 7, Table T7 may contain values (for example, X11) of the average levels $IN[1]_{AVG}$ to $IN[m]_{AVG}$ of the input signals IN[1:m] and values (for example, P1) of the average $PWR_{AVG}$ of leakage power that are listed according to r unit intervals PER1 to PERr. Accordingly, Table T7 may function as a look-up table that outputs leakage power corresponding to test input signals that an integrated circuit designer applies to the circuit design to verify the circuit design. To this end, as described later with reference to FIG. 11, the average levels of the test input signals may be calculated in unit intervals, and values of leakage power in the unit intervals may be estimated on the basis of Table T7.

FIG. 8 is a flowchart illustrating a method of generating a leakage power model according to an example embodiment, and FIG. 9 is a view illustrating example operations in the method shown in FIG. 8, according to an example embodiment. In some embodiments, operation S690 shown in FIG. 8 may be included in operation S600 shown in FIG. 1 and may be performed, for example, after performing all the operations shown in FIG. 5. Furthermore, in some embodiments, operation S690 shown in FIG. 8 may be performed by the model generator 46 shown in FIG. 4. As shown in FIG. 8, operation S690 may include a plurality of operations S692, S694, and S696, and FIG. 8 will now be described with reference to FIG. 5.

In operation S692, the unit intervals may be grouped on the basis of the average levels. For example, at least two unit intervals of the r unit intervals in which the average levels of the input signals IN [1: m] calculated according to the example shown in FIG. 5 have the same values may be grouped as one unit interval by the model generator 46. For example, as shown in an upper portion of FIG. 9, an i-th unit interval PERi and a j-th unit interval PERj in Table T9a may have the same average levels of input signals, that is, 0.2, 0.5, and 0.3 ($1 \le i \le r$, $1 \le j \le r$, $i \ne j$). Accordingly, as shown in a lower portion of FIG. 9, the model generator 46 may group the i-th unit interval PERi and the j-th unit interval PERj as one unit interval, that is, a k-th unit interval PERk.

In operation S694, the average of leakage power averages may be calculated. For example, the model generator 46 may calculate the average of leakage power averages of unit intervals which are grouped in operation S692. For example, the average $PWR_{AVG}$ of leakage power in the k-th unit interval PERk may be the average of the leakage power in the i-th unit interval PERi and the leakage power in the j-th unit interval PERj, that is, 0.45 which is the average of 0.5 and 0.4. Accordingly, Table T9a may be converted into Table T9b, and the number of rows of Table T9b may be equal to or less than the number of rows of Table T9a.

In operation S696, a linear model may be generated. For example, the model generator 46 may express the average $PWR_{AVG}$ of leakage power as a linear function of input signal averages $IN[1]_{AVG}$, $IN[2]_{AVG}$, and $IN[3]_{AVG}$, for example, on the basis of Table T9b of FIG. 9 obtained in operation 692. This may be generally expressed as Equation 1 below.

$$PWR_{AVG} = a + b \cdot IN[1]_{AVG} + c \cdot IN[2]_{AVG} + d \cdot IN[3]_{AVG} + \ldots \quad \text{[Equation 1]}$$

In Equation 1, a constant (a) and coefficients (b, c, d, etc.) may be derived from values contained in the table converted in operation S692 by various methods. Accordingly, the leakage power model corresponding to the circuit design may be expressed as a linear function of the input signals provided to the circuit design. In some embodiments, the leakage power model may be defined as a nonlinear function such as an exponential function or a logarithmic function on the basis of the table converted in operations S692 and S694. Furthermore, in some embodiments, as described above with reference to FIG. 8, Table T9b may function as a look-up table of the leakage power model. In this case, operation S694 may be omitted.

Figure 10:
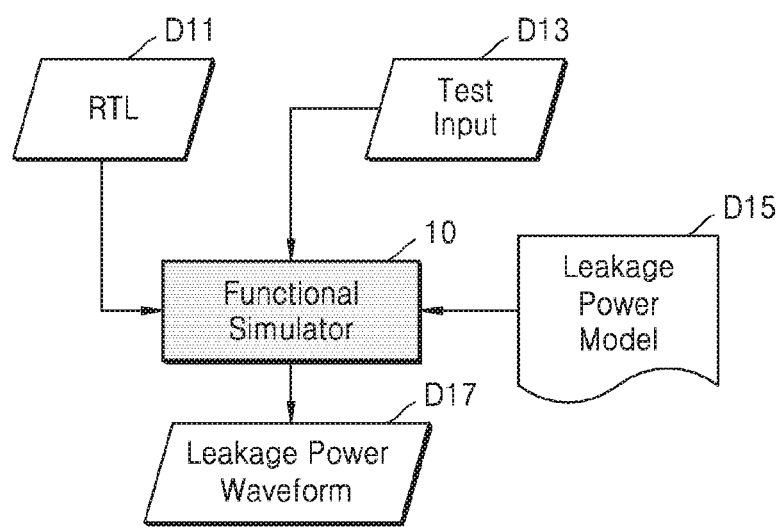
FIG. 10 is a block diagram illustrating flows of data according to an example embodiment.

FIG. 10 is a block diagram illustrating flows of data according to an example embodiment. When the circuit design shown in FIG. 10 is compared with the example embodiment shown in FIG. 1, the circuit design may correspond to RTL data D11 and may be the same as netlist data (for example, the netlist data D41 shown in FIG. 4) used to generate a leakage power model D15.

Referring to FIG. 10, the RTL data D11 and test input data D13 may be provided to a functional simulator 10. Like the functional simulator 42 shown in FIG. 4, the functional simulator 10 may simulate the circuit design defined by the RTL data D11 according to input signals defined in the test input data D13 to derive values (or levels) of the input signals, internal signals, and output signals. In addition, the leakage power model D15 may be provided to the functional simulator 10, and during simulation, the functional simulator 10 may generate leakage power waveform data D17 on the basis of the leakage power model D15. In some embodiments, the leakage power model D15 may be provided to the functional simulator 10 in a Verilog procedural interface (VPI) format. In some embodiments, the functional simulator 10 may be a software block including a series of instructions and may be executed on a computing system including a display device. The functional simulator 10 may display the waveform of leakage power on the display device on the basis of the leakage power waveform data D17. Accordingly, the leakage power waveform data D17 may represent estimated leakage power of the circuit design according to time, and a designer may verify or redesign the circuit design with reference to the waveform of leakage power. In some embodiments, the functional simulator 10 shown in FIG. 10 may be the same as the functional simulator 42 shown in FIG. 4.

Figure 11:
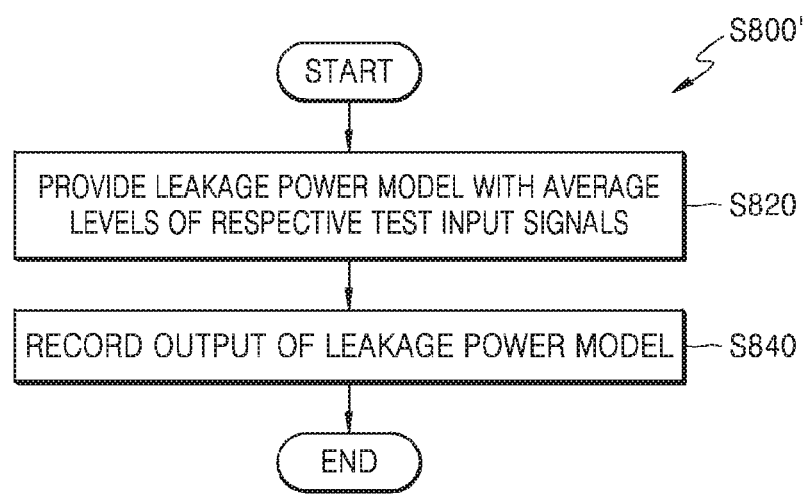
FIG. 11 is a flowchart illustrating an example of operation S800 of FIG. 1, according to an example embodiment.

FIG. 11 is a flowchart illustrating an example of operation S800 of FIG. 1, according to an example embodiment. As described with reference to FIG. 1, in operation S800' shown in FIG. 11, leakage power of the circuit design may be estimated, and as shown in FIG. 11, operation S800' may include operations S820 and S840. For example, operation S800' shown in FIG. 11 may be performed by the functional simulator 10 shown in FIG. 10, and FIG. 11 will now be described with reference to FIG. 10.

In operation S820, the average levels of the test input signals may be provided to the leakage power model D15. For example, the functional simulator 10 may provide the leakage power model D15 with the average levels of the test input signals in each of unit intervals having the same lengths as unit intervals used to generate the leakage power model D15. In some embodiments, if the leakage power model D15 includes a look-up table (for example, Table T7 of FIG. 7 or Table T9b of FIG. 9), the leakage power model D15 may calculate the average $P_{AVG}$ of leakage power contained in the look-up table in response to the average levels of the test input signals. In some embodiments, if the leakage power model D15 includes a linear function such as Equation 1, the leakage power model D15 may output the average $P_{AVG}$ of leakage power calculated from the average levels of the test input signals.

In operation S840, the output of the leakage power model D15 may be recorded. For example, the functional simulator 10 may record the output of the leakage power model D15 in each unit interval together with information about the unit interval. Therefore, a leakage power waveform may be generated, and the leakage power waveform data D17 including the leakage power waveform may be generated.

Figure 12:
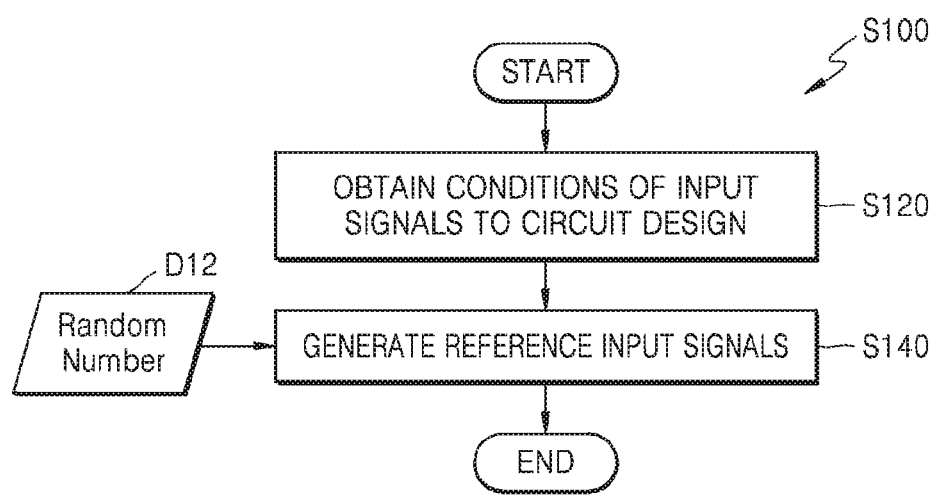
FIG. 12 is a flowchart illustrating a method of generating reference input signals, according to an example embodiment.

FIG. 12 is a flowchart illustrating a method of generating reference input signals, according to an example embodiment. In some embodiments, operation S100 shown in FIG. 12 may be performed prior to operation 200 shown in FIG. 1. For example, operation S100 may be performed by the model generator 46 shown in FIG. 4. As shown in FIG. 12, operation S100 may include operations S120 and S140, and FIG. 12 will now be described with reference to FIG. 1.

In operation S120, conditions of input signals to the circuit design may be obtained. For example, as described with reference to FIG. 2, inputs of the circuit design may include a clock input, and factors such as the cycle and transition time of a clock signal to the clock input may be previously defined as conditions. In addition, the inputs of the circuit design may include a reset input, and a condition in which a reset signal to the reset input is initially activated (for example, the reset signal has a value of "1") for a certain period of time and is then deactivated (for example, the reset signal has a value of "0") may be previously defined. In the next operation S140, the model generator 46 may generate values of at least one input signal to be applied to at least one of the inputs of the circuit design according to such conditions.

In operation S140, reference input signals may be generated on the basis of random numbers D12. The random numbers D12 may be generated in various manners, for example, by a random number generator or a pseudo random number generator. The model generator 46 may generate reference input signals having random values based on the random numbers D12 within a range except for certain input signals and a certain input signal range according to the conditions obtained in operation S120.

Figure 13:
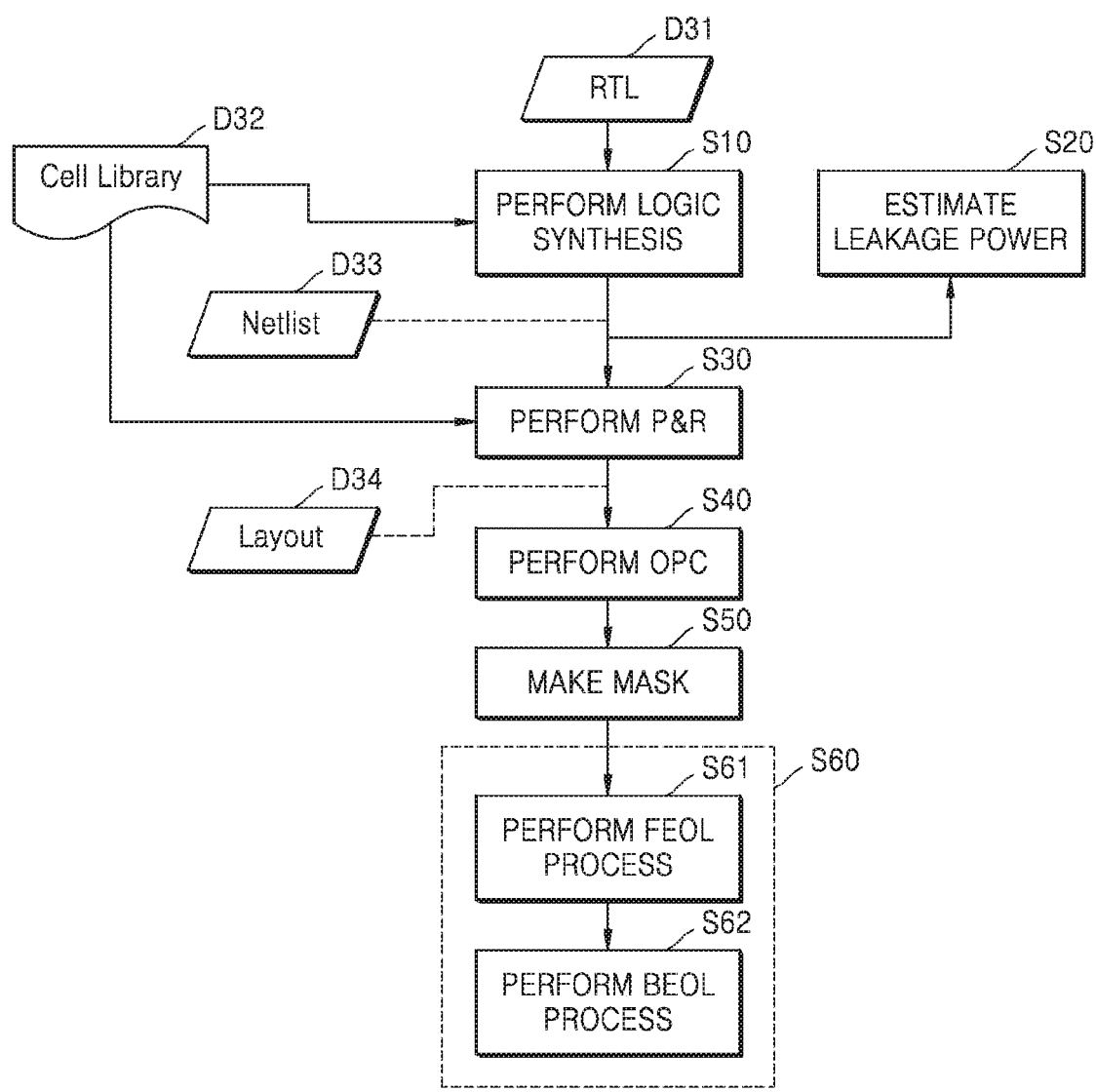
FIG. 13 is a flowchart illustrating a method of manufacturing an integrated circuit, according to an example embodiment.

FIG. 13 is a flowchart illustrating a method of manufacturing an integrated circuit, according to an example embodiment. As shown in FIG. 13, the method of manufacturing an integrated circuit may include operation S20 of estimating leakage power.

A cell library D32 may include information on a plurality of cells such as function information, characteristic information, or layout information on a plurality of cells. A cell refers to a unit of a layout that is included in an integrated circuit, and an integrated circuit may include various cells. In some embodiments, cells may be referred to as standard cells and may have a structure conforming to a preset standard. For example, cells may have a preset height and a pair of power rails between opposite boundaries thereof.

In operation S10, logic synthesis may be performed to generate netlist data D33 from RTL data D31. In a non-limiting example, a semiconductor design tool (for example, a logic synthesis tool) may generate the netlist data D33 including a bitstream and/or a netlist by performing logic synthesis while referring to the cell library D32 from RTL data D31 written in a hardware description language (HDL) such as very high speed integrated circuit (VHSIC) hardware description language (VHDL) or Verilog.

In operation S20, leakage power may be estimated. As described above with reference to the drawings, the netlist data D33 may be data defining an integrated circuit and may be referred to as a circuit design, and leakage power of the circuit design may be estimated by the functional simulator 42, the power calculator 44, or the model generator 46 shown in FIG. 4. A designer may change or verify the circuit design on the basis of the estimated leakage power. When changing the circuit design, the designer may prepare new RTL data D31 and may generate netlist data D33 by performing logic synthesis in operation S10 to re-estimate leakage power of a new circuit design in operation S20.

In operation S30, place & routing (P&R) may be performed to generate layout data D34 from the netlist data D33. For example, the layout data D34 may have a format such as GDSII and may include cells and geometric information about wires electrically connecting the cells to each other. Therefore, like the netlist data D33, the layout data D34 may be referred to as data defining the integrated circuit.

In operation S40, optical proximity correction (OPC) may be performed. The OPC may refer to an operation for forming a pattern having an intended shape by correcting distortion such as refraction caused by the features of light in a photolithography process of semiconductor processes for manufacturing integrated circuits. Data for making at least one mask may be extracted from the layout data D34, and a pattern on the mask may be determined by applying OPC to the extracted data. In some embodiments, the layout of the integrated circuit may be limitedly modified in operation S40. In operation S40, the limited modification of the layout of the integrated circuit may be post-processing for optimizing the structure of the integrated circuit and may be referred to as design polishing.

In operation S50, the mask may be made. For example, mask patterns for forming patterns on a plurality of layers may be defined by applying the OPC to the layout data D34, and at least one mask (or photomask) may be made for forming patterns on each of the plurality of layers.

In operation S60, the integrated circuit may be manufactured. For example, a plurality of layers may be patterned using the at least one mask made in operation S50 to manufacture the integrated circuit. As shown in FIG. 13, operation S60 may include operations S61 and S62.

In operation S61, a front-end-of-line (FEOL) process may be performed. The FEOL process may refer to a process of forming individual elements such as transistors, capacitors, or resistors on a substrate when manufacturing an integrated circuit. For example, the FEOL process may include planarizing and cleaning a wafer, forming wells, forming gate lines, and forming sources and drains. Portions formed by the FEOL process may be referred to as FEOL regions, and for example, the FEOL regions may include an active region, a diffusion region, a gate line, or a contact.

In operation S62, a back-end-of-line (BEOL) process may be performed. The BEOL process may refer to an process of connecting the individual elements such as transistors, capacitors, or resistors to each other. For example, the BEOL process may include silicidation of gate, source, and drain regions, dielectric addition, planarization, hole formation, metal layer addition, via formation, or passivation layer formation. Portions formed by the BEOL process may be referred to as BEOL regions, and for example, the BEOL regions may include vias, metal layer patterns, or the like. Next, the integrated circuit may be packaged in a semiconductor package and may be used as a component of various applications.

Figure 14:
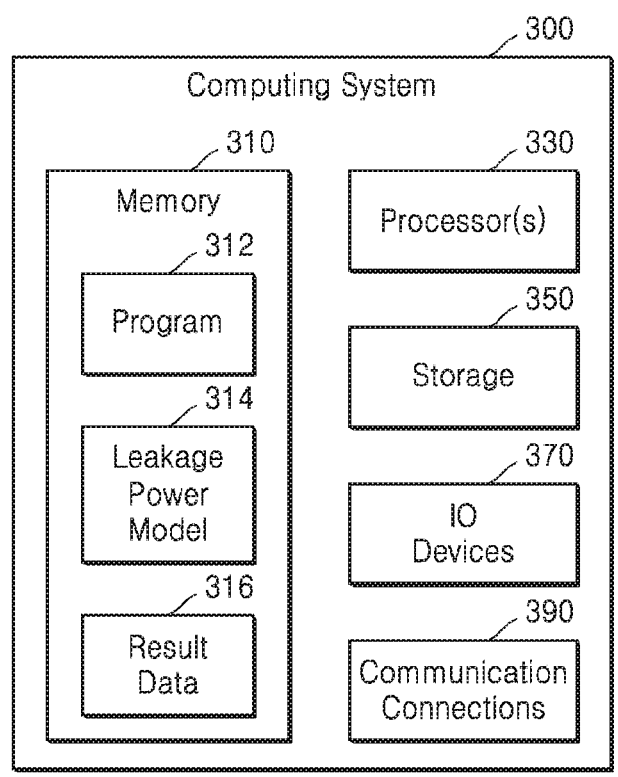
FIG. 14 is a block diagram illustrating a computing system according to an example embodiment.

FIG. 14 is a block diagram illustrating a computing system 300 according to an example embodiment. In some embodiments, the method of estimating leakage power of a circuit design at an early stage may be performed by the computing system 300 shown in FIG. 14. As shown in FIG.

14, the computing system 300 may include a memory 310, at least one processor 330, a storage 350, input/output devices 370, and communication connections 390. Components of the computing system 300 may be interconnected through a bus for communication with each other.

The memory 310 may include a program 312, a leakage power model 314, and resulting data 316. In some embodiments, the program 312, the leakage power model 314, and the resulting data 316 may be stored in the storage 350, and at least a portion of the program 312, the leakage power model 314, and the resulting data 316 may be loaded on the memory 310. Non-limiting examples of the memory 310 may include a volatile memory such as a static random access memory (SRAM) or a dynamic random access memory (DRAM) and a non-volatile memory such as a flash memory.

The program 312 may cause the at least one processor 330 to perform at least a portion of the method of manufacturing an integrated circuit or the method of estimating leakage power of a circuit design at an early stage, according to the example embodiments. For example, the program 312 may include a plurality of instructions executable by the at least one processor 330, and as the plurality of instructions included in the program 312 are executed by the at least one processor 330, at least a portion of the methods of the example embodiments may be performed.

The leakage power model 314 may include a look-up table in some embodiments or may include a linear function in some other embodiments. As described above with reference to the drawings, the leakage power model 314 may provide leakage power in response to the averages of respective test input signals.

The resulting data 316 may include data processed by the at least one processor 330 and/or data received from the outside of the computing system 300. For example, the resulting data 316 may include at least a portion of the netlist data D41, the reference input data D43, the VCD data D45, and the leakage power data D47 described with reference to FIG. 4, or at least a portion of the RTL data D11, the test input data D13, and the leakage power waveform data D17 described with reference to FIG. 10.

The at least one processor 330 may include at least one core that may execute any set of instructions (for example, Intel Architecture-32 (IA-32), 64-bit Extended IA-32, x86-64, PowerPC, Sparc, MIPS, ARM, IA-64, or the like). The at least one processor 330 may execute instructions stored in the memory 310 and may perform at least a portion of the methods of the example embodiments by executing the program 312.

The storage 350 may not lose data stored therein even when power supplied to the computing system 300 is interrupted. Examples of the storage 350 may include: non-volatile memories such as an electrically erasable programmable read-only memory (EEPROM), a flash memory, a phase change random access memory (PRAM), a resistance random access memory (RRAM), a nano floating gate memory (NFGM), polymer random access memory (PoRAM), a magnetic random access memory (MRAM), and ferroelectric random access memory (FRAM); and storage media such as magnetic tape, optical disks, and magnetic disks. In some embodiments, the storage 350 may be removable from the computing system 300. In some embodiments, the storage 350 may store a file prepared in a programming language, and a program 312 generated from the file by a compiler or the like or at least a portion of the program 312 may be loaded on the memory 310.

In some embodiments, the storage 350 may store data to be processed by the at least one processor 330 and/or data processed by the at least one processor 330. For example, the storage 350 may store the RTL data D11 and the leakage power waveform data D17 described with reference to FIG. 10 and may store data such as the VCD data D45 and the leakage power data D47 which are generated while the methods of the example embodiments are performed.

The input/output devices 370 may include an input device such as a keyboard or a pointing device and an output device such as a display device or a printer. For example, a user may use the input/output devices 370 to trigger execution of the program 312 by the at least one processor 330, input the netlist data D41 shown in FIG. 4, or input conditions of inputs of a circuit design obtained in operation S120 shown in FIG. 12.

The communication connections 390 may provide access to an external network outside the computing system 300. For example, the network may include a plurality of computing systems and communication links, and the communication links may include wired links, optical links, wireless links, or any other type of link.

Figure 15:
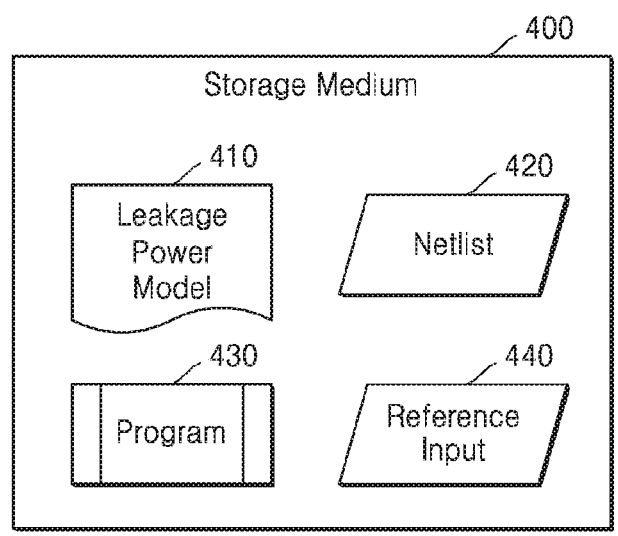
FIG. 15 is a block diagram illustrating a storage medium according to an example embodiment.

FIG. 15 is a block diagram showing a storage medium 400 according to an example embodiment. The same description as that presented with reference to FIG. 14 will not be presented when describing FIG. 15. The storage medium 400 may include any storage medium that may be read by a computer to provide instructions and/or data to the computer. Examples of the storage medium 400 may include magnetic or optical media such as disks, tape, CD-ROMs, DVD-ROMs, CD-R, CD-RW, DVD-R, and DVD-RW; volatile or non-volatile memories such as RAMs, ROMs, and flash memories; non-volatile memories accessible via USB interfaces; and microelectromechanical systems (MEMS). The storage medium 400 may be insertable into a computer, integrated within a computer, or connected to a computer via a communication medium such as a network and/or a wireless link.

Referring to FIG. 15, the storage medium 400 may be a non-transitory storage medium readable by a computer and may include a leakage power model 410, netlist data 420, a program 430, and reference input data 440. FIG. 15 illustrates that the leakage power model 410, the netlist data 420, the program 430, and the reference input data 440 are stored in the same storage medium 400. In some embodiments, however, the leakage power model 410, the netlist data 420, the program 430, and the reference input data 440 may be stored in different storage media.

According to the system and method of the example embodiment for estimating leakage power of a circuit design at an early stage, the leakage power of a circuit design may be accurately estimated with low calculation complexity.

In addition, according to the system and method of the example embodiments for estimating leakage power of a circuit design at an early stage, a graph in which variations in leakage power are shown according to operations of a circuit design may be obtained, and thus a designer may exactly grasp leakage power characteristics of the circuit design.

In addition, according to the system and method of the example embodiments for estimating leakage power of a circuit design at an early stage, leakage power corresponding to input signals to a circuit design may be estimated, and thus more actual leakage power of the circuit design may be estimated at an early stage.

In addition, the system and method of the example embodiments for estimating leakage power of a circuit design, leakage power of a circuit design may be accurately estimated at an early stage in integrated circuit manufacture, thereby markedly reducing a time period for designing integrated circuits and allowing early designing and manufacturing of high-performance integrated circuits.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A system comprising:
a memory configured to store computer-executable instructions; and
at least one processor configured to perform a method of estimating leakage power of a circuit design by executing the computer-executable instructions,
wherein the method of estimating leakage power of a circuit design comprises:
obtaining waveform data by performing a functional simulation on a circuit design according to reference input signals;
obtaining leakage power data by calculating power consumption of the circuit design according to the waveform data;
generating a leakage power model of the circuit design based on the waveform data and the leakage power data; and
estimating leakage power of the circuit design by performing a functional simulation on the circuit design according to test input signals on a basis of the leakage power model.

2. The system of claim 1, wherein the leakage power model comprises a look-up table providing an average of the leakage power for a unit interval, the average corresponding to a combination of average levels of respective input signals to the circuit design for the unit interval.

3. The system of claim 1, wherein the leakage power model comprises a linear function usable to calculate an average of the leakage power for a unit interval from average levels of respective input signals to the circuit design for the unit interval.

4. The system of claim 1, wherein the leakage power data comprises a graph of the leakage power synchronized with the waveform data.

5. The system of claim 4, wherein the generating the leakage power model of the circuit design comprises:
respectively calculating average levels of the reference input signals for each unit interval; and
calculating an average of the leakage power for each unit interval.

6. The system of claim 5, wherein the generating the leakage power model further comprises:
grouping unit intervals having identical average levels of the reference input signals as one unit interval; and
calculating an average of the averages of the leakage power in the grouped unit intervals.

7. The system of claim 5, wherein the circuit design comprises a clock input, and the each unit interval is a multiple of a cycle of a clock signal applied to the clock input.

8. The system of claim 4, wherein the generating the leakage power model comprises:
respectively calculating first average levels of the reference input signals and a first average of the leakage power for a first unit interval; and
respectively calculating second average levels of the reference input signals and a second average of the leakage power for a second unit interval.

9. The system of claim 8, wherein the generating the leakage power model further comprises grouping the first unit interval and the second unit interval as one unit interval when the first average levels are equal to the second average levels, and calculating an average of the first average and the second average of the leakage power.

10. The system of claim 1, wherein the estimating the leakage power comprises:
providing the leakage power model with average levels of the test input signals for each unit interval; and
recording output power of the leakage power model for each unit interval.

11. The system of claim 1, wherein the estimating the leakage power comprises:
obtaining conditions of input signals to the circuit design; and
generating the reference input signals based on random numbers and the conditions of the input signals.

12. The system of claim 1, wherein the circuit design comprises netlist data defining a plurality of elements and a connection relationship between the plurality of elements.

13. The system of claim 1, wherein the waveform data has a format of at least one of a value change dump (VCD) and a fast signal database (FSDB).

14. A computer-implemented method of estimating leakage power of a circuit design, the computer-implemented method comprising:
obtaining waveform data by performing a functional simulation on a circuit design according to reference input signals;
obtaining leakage power data by calculating power consumption of the circuit design according to the waveform data;
generating a leakage power model of the circuit design based on the waveform data and the leakage power data; and
estimating leakage power of the circuit design by performing a functional simulation on the circuit design according to test input signals on a basis of the leakage power model.

15. The computer-implemented method of claim 14, wherein the leakage power model comprises a look-up table providing an average of the leakage power for a unit interval, the average corresponding to a combination of average levels of respective input signals to the circuit design for the unit interval.

16. The computer-implemented method of claim 14, wherein the leakage power model comprises a linear function usable to calculate an average of the leakage power for a unit interval from average levels of respective input signals to the circuit design for the unit interval.

17. The computer-implemented method of claim 14, wherein the leakage power data comprises a graph of the leakage power synchronized with the waveform data.

18. The computer-implemented method of claim 17, wherein the generating the leakage power model of the circuit design comprises:
respectively calculating average levels of the reference input signals for each unit interval; and
calculating an average of the leakage power for each unit interval.

19. The computer-implemented method of claim 18, wherein the generating the leakage power model further comprises grouping unit intervals having identical average levels of the reference input signals as one unit interval and calculating an average of the averages of the leakage power in the grouped unit intervals.

20. A non-transitory storage medium storing computer-executable instructions for performing operations of estimating leakage power of a circuit design using at least one processor, the operations comprising:
obtaining waveform data by performing a functional simulation on a circuit design according to reference input signals;
obtaining leakage power data by calculating power consumption of the circuit design according to the waveform data;
generating a leakage power model of the circuit design based on the waveform data and the leakage power data; and
estimating leakage power of the circuit design by performing a functional simulation on the circuit design according to test input signals on a basis of the leakage power model.

* * * * *